United States Patent Office 3,508,956
Patented Apr. 28, 1970

3,508,956
TREATMENT OF GLASS SURFACES
Frank Moser, Sarver, and Richard R. Lewchuk, Allison Park, Pa., assignors to PPG Industries, Inc., Pittsburgh, Pa., a corporation of Pennsylvania
No Drawing. Continuation of application Ser. No. 424,853, Jan. 11, 1965, which is a continuation-in-part of application Ser. No. 166,354, Jan. 15, 1962. This application July 5, 1968, Ser. No. 747,003
Int. Cl. C03c 17/28
U.S. Cl. 117—124                                    10 Claims

ABSTRACT OF THE DISCLOSURE

A glass article which is resistant to staining, iridescence, and scumming by reason of a dried residue of a basic solution of a metal ammino halide or a metal ammino nitrate on the surface thereof, the metal being an amphoteric metal such as zinc, copper, chromium, lead, aluminum, and beryllium. The process for forming such article comprises contacting the glass at about 200° C. with a basic solution of ammonium hydroxide and an amphoteric metallic ammino compound of the type described above. The coating solution is allowed to dry to a protective residue.

---

This is a continuation of application Ser. No. 424,853, filed Jan. 11, 1965, now abandoned, which, in turn, is a continuation-in-part of application Ser. No. 166,354, filed Jan. 15, 1962, now abandoned.

Glass which is stored for any length of time under humid atmospheric conditions has a tendency to discolor and develop a stain on its surface that causes the glass to lose its initial transparency or reduce its translucency. This condition is particularly acute when window, rough ground or ground and polished plate glass is stored in stacks of contacting sheets but also occurs, though more slowly, on isolated pieces of glass. The initial stage of this glass weathering phenomenon results in the development of a siliceous film of irregular thickness that has a refractive index which differs from that of the underlying glass sheet due to a higher concentration of the alkali and alkaline earth metals being present in the film, as compared with the concentrations of these metals in the underlying glass. The thin film which develops on the surface of the glass resembles a light film of oil in that it appears multicolored and contains various shades of yellow, red, green and purple. Iridescence is the term applied to describe this early discoloration of the surface of the glass.

As the weathering process continues, the surface of the glass takes on a frosted appearance which is characteristically white and spotted. Scum refers to the resulting white powdery deposits which collect on the surface of the glass after prolonged exposure to humid conditions and is largely a mixture of $Na_2SiO_3 \cdot XH_2O$, $CaCO_3$, $CaSiO_3 \cdot XH_2O$ and $Na_2CO_3$. Stain refers to the white, spotted discoloration and etching of the glass surface which remains after the scum is washed off and which cannot be removed unless the surface of the glass is ground and polished.

Ordinary glass is composed of an acidic oxide such as silica and base metal oxides such as the oxides of the alkali and alkaline earth metals. The base metal oxides, even in glass, are more or less soluble in water so that glass surfaces exposed to moisture are subjected to a leaching action that tends to dissolve these more soluble components out of the glass surface. The probable reactions the present invention protects against and which probably are responsible for most of the iridescence, scumming and staining of the glass may briefly be described as follows. Ordinary soda-lime-silica glass surfaces, being hydrophilic, adsorb moisture from the atmosphere which collects on the surface of the glass. The water which collects on the glass dissolves part of the glass surface taking the soluble sodium ions and the somewhat less soluble calcium ions from the surface of the glass into solution to produce an aqueous solution of sodium hydroxide and calcium hydroxide. The resulting aqueous sodium hydroxide and calcium hydroxide solutions have the ability to dissolve silicates which are present in the surface of the glass. The result of this process is the formation of $Na_2SiO_3 \cdot XH_2O$ and $CaSiO_3 \cdot XH_2O$ which constitute a major part of the scum that develops.

As stated above, analysis of the scum reveals a high concentration of carbonate in the form of $Na_2CO_3$ and $CaCO_3$. It is theorized that carbon dioxide from the atmosphere reacts with the sodium and calcium ions dissolved out of the surface of the glass and upon drying deposits the respective carbonate upon the surface of the glass as a white powder.

The prior art has disclosed that the iridescence and staining that develop in glass sheets in storage subjected to humid atmospheric conditions can be inhibited by contacting the surface of the glass with a slightly acidic agent having a pH value between 4 and 7. The disclosed acidic agents are metallic salts consisting of weak metallic bases and strong acids. The acidic agents are contacted with the surface of the glass by spraying in a solution or combining the acidic agents with an inert material and contacting the combination in some manner with the surface of the glass.

Acidic gases such as $SO_2$ and $SO_3$ have also been used to inhibit the weathering effects on glass by treating the glass for about 30 minutes at temperatures between 300–600° C. in 3 percent to 5 percent acidic gas atmospheres.

It is theorized in the prior art that the slightly acidic agent protects the glass from weathering effects by neutralizing the alkali concentrated in the surface of the glass resulting in a neutral surface which does not dissolve to form a corrosive solution as the surface of the glass adsorbs moisture.

A shortcoming involved in the treatments disclosed in the prior art is that the suggested acidic solutions are corrosive and tend to result in a light permanent etch that decreases the transparency of the treated glass. The slight etched reaction developed on the surface of the glass is difficult to remove.

The advantages of the present invention over the disclosed acidic ($SO_2$ and $SO_3$) gas treatment are that the present invention can be effected at lower temperatures (55–150° C.) as compared with 300–600° C., and much more rapidly than the 30 minutes required in the acidic gas treatment. The coating time of the present invention's solution technique is of the order of 1 minute as compared with the 30 minutes necessary to protect the glass utilizing the $SO_2$ and $SO_3$ acidic gas treatment.

The present invention can also be easily adapted to present glass production methods without the need for the elaborate new equipment required in the acidic gas process.

In accordance with the present invention, the tendency to etch and stain exhibited by acidic agents is overcome by preparing a solution of an amphoteric metallic compound, adding ammonium hydroxide to the solution to adjust its pH to a value just above that at which the metallic hydroxide precipitates out of the solution and contacting the surface of the glass with the solution.

A residue develops whenever the basic metallic salt solution is deposited on the surface of the glass being treated and allowed to dry. A chemical analysis of the residue shows that it consists of any excess of the amphoteric metal amino compound applied to the surface of the glass and other ammonium compounds. The excess is that part of the amphoteric metal ammino compound applied that has not reacted with the surface of the glass. The ammonium compounds result in part from the amphoteric metal ammino compound reacting with the surface of the glass and incorporating its amphoteric metallic ion into the glass surface, leaving the balance of the applied chemical compound in the residue in the form of an ammonium compound. Other sources of ammonium compounds in the residue are the reaction products of the ammonium hydroxide addition with the other constituents of the treating solution. Upon a detergent washing of the basically treated glass surface, the powdery residue is easily removed and the original transparency of the glass is restored.

It is theorized that moisture tends to attack the glass surface most readily at those places on the surface of the glass where an unsatisfied valence of one of the ions that go to make up the surface of the glass exists. This unsatisfied valence at the surface of the glass is believed to be satisfied by the metallic ion added in the treating solutions. The metallic ion as it satisfies the unsatisfied valences on the surfaces of the glass becomes part of the surface of the glass and decreases the number of available active sites or unsatisfied valences that a water molecule could be attracted to. The satisfaction of the free valences renders the surface of the glass non-polar and hydrophobic. This decreases the ability of water, being a polar molecule, to wet the surface of the glass and develops a glass surface that resists moisture adsorption.

The glass surface protection that results is also increased by a partial exchange of the treating solution's amphoteric metal ion for the more soluble metal ions that exist on the surface of the glass. The resultant exchange of metallic ions, for example, zinc for sodium, changes the chemical composition of the surface of the glass and renders the surface of the glass more resistant to moisture attack by incorporating in the glass surface less soluble components.

The prepared basic agent can be applied between room temperature, approximately 20° C., and 200° C., but adequate protection combined with ease of application dictates application at temperatures above room temperature, for example, between temperatures of 55° C. and 150° C. The degree of protection that is imparted to the glass surface increases with increases in temperatures of application up to about 150° C. to 200° C., after which little benefit is derived from higher treating temperatures. This effect has been observed with respect to the use of amphoteric metal compounds regardless of the pH of the treating solution containing the amphoteric metal compound.

The glass surface that develops during most glass fabrication processes is high in the number of unsatisfied surface valences due to hydroxide radicals being present on the surface of the glass. The increased temperature enhances the rate at which the metallic ions in solution react with the surface of the glass to satisfy the free valences which exist on the surface of the glass, and increases the total number of surface valences that are satisfied. It is believed that the increased protection that results at higher temperatures is due to the increased mobility of the metallic ion at the higher temperatures.

It is theorized that glass surface treatment according to the present invention results in the metallic ion from the treating solution being bonded to the surface of the glass as a bridge between two hydroxyl groups that are present on the glass surface. This is theorized from the teaching of The Physical Chemistry of the Silicates, by Wilhelm Eitel, pages 342–345 (1954). Due to the relatively low temperatures of application and the low concentrations of metallic ions in the solutions necessary to develop protection, it is believed that little metal to metal bonding develops on the surface of the glass.

Glass surfaces treated with basic solutions of amphoteric metallic ammino compounds render the surface of the glass non-polar and thus decrease the ability of water to wet the surface of the glass. For example, the contact angle of a water droplet on the surface of glass treated as disclosed in this invention increases from 0 degrees to a range of 40 to 50 degrees for copper and zinc ammino chlorides in basic solutions and from 0 degrees up to 70 degrees for chromium ammino chloride in a basic solution. The increase in the contact angle is a measure of the protection of the glass surface from moisture adsorption and it indicates the degree of hydrophobic behavior the glass surface exhibits.

Chemical analyses of the glass surface that results after treatment utilizing an acid leaching technique followed by a quantitative analysis for the metallic ion show over 100 times more Zn, Cu and Cr on respective treated surfaces in comparison to the metallic ion content of the leachate of untreated glass. These analyses substantiate that surface changes involving the incorporation of the metallic ion into the surface of the glass promote the protection that develops in the treated glass surfaces.

Excellent protection of the glass surface results when the glass surface is heated between 55° C. and 150° C. As the temperature of the glass treated is increased above 200° C., so is the tendency of the glass to crack upon being contacted with the treating solution.

By adjustment of the water-alcohol ratio in the treating solution and applying the treating solution to the surface of the glass at a point in the fabrication of the glass during which the glass is in the temperature range of 50° C.–150° C., the treating solution can be easily evaporated at a desirable rate that does not interfere with the normal steps of the glass manufacturing process.

The compounds found to effectuate the protection of glass from iridescence, scumming and staining according to the present invention are the amphoteric metallic ammino compounds. The ammino fluorides, chlorides, bromides, iodides and nitrates of the amphoteric metallic elements, particularly the ammino chlorides and nitrates of Zn, Cu, Cr, Pb, Al and Be, are the compounds that yield the best protection. The best of the amphoteric ammino chlorides for the prevention of the weathering effects is $Zn(NH_3)_4Cl_2$. The best of the amphoteric ammino nitrates is $Zn(NH_3)_4(NO_3)_2$.

The amphoteric metallic ammino compounds in the present invention can be applied in concentrations between 0.5 and 15 percent by weight in the treating solutions. Below 0.5 percent little protection results and over 15 percent little improvement results from the increased concentrations of the metallic ion. A concentration of 2 percent of the metallic ammino compound in the solution is almost always adequate.

The pH of the treating solutions preferably varies from a little above 7.0 to approximately 11.0. The best protection, combined with ease of residue removal and the absence of etching reactions of the treated glass surface, occur most frequently when the pH of the treating solution is between pH 8.0 and 9.0. The preferred pH for a particular solution is arrived at by determining the pH below which the respective amphoteric metallic ion in the treating solution precipitates out of the solution as a metal hydroxide and then adjusting the pH value above that point to form a stable, soluble, amphoteric metallic ammino compound solution. Protection will result below the pH value at which the metallic ion precipitates out of the solution as the metallic hydroxide but the protection is not as lasting nor is the treating solution's residue as easy to remove.

The base used to adjust the pH value of the solution is ammonium hydroxide because it produces the soluble, stable, metallic ammino compounds in the treating solution. The ammonium hydroxide addition also reduces the etching of the glass and makes the treating solution's residue easy to remove with a detergent washing. It is believed that the ammonium hydroxide also acts as a catalyst to speed up the rate of the amphoteric metallic ions adsorption on the unsatisfied valence sites that make up part of the surface of the glass. Other bases used to adjust the pH do not result in the desirable metallic ammino compound nor do they exhibit any catalytic action or promote easier removal of the treating solution's residue.

The solvent to be used to dissolve the metallic salt may be 100 percent distilled water, 100 percent alcohol or any combination of water and alcohol. The alcohol may contain up to 3 carbon atoms with ethyl alcohol and isopropyl alcohol being examples of suitable alcohols. The ratio of water to alcohol is determined by the wetting characteristics and rate of drying of the treating solution desired. The higher the percentage of alcohol, the higher the wetting power of the solution and the more rapidly it will dry after it is applied. No difficulty is encountered in adjusting aqueous, alcoholic or aqueous-alcoholic mixtures to the desired basic pH using ammonium hydroxide.

The basic metallic ammino compound treating solutions can also be combined with inert materials such as talcum, wood flour, hydrated calcium sulfate, kaolin, micaceous minerals, sawdust or paper and the combination contacted with the surface of the glass to provide the protection from the weathering phenomena. These materials are illustrative of powdery materials which do not deleteriously affect a glass surface.

The various embodiments of the invention are illustrated in the following examples:

EXAMPLE I

Twenty (20) grams of $ZnCl_2$ are dissolved in 800 grams of a 50:50 mixture (by weight) of ethyl alcohol and distilled water. An acid range zinc chloride solution (pH 5.4) is obtained. After the $ZnCl_2$ has been dissolved in the aqueous alcoholic solution, concentrated ammonium hydroxide is added dropwise until the pH value of the solution is approximately 11.0. An excess of ammonium hydroxide is necessary to redissolve the $Zn(OH)_2$ that precipitates out of the solution when the solution is weakly basic and to form a stable soluble Zn ammino chloride solution. The pH value is then reduced to a pH of about 8.4 by adding concentrated hydrochloric acid dropwise to the Zn ammino chloride solution. The total solution is brought up to weight (1000 grams).

This prepared zinc ammino chloride solution is then sprayed on the glass which is heated to a temperature of 100° C. in an amount approximately 1/16 of a fluid ounce per square foot of glass surface.

After the treating solution has dried, a powdery residue is present on the surface of the glass which is made up of excess zinc ammonium chlorides and ammonium chloride. The treatment of the glass at 100° C. enables one to remove this residue of the dried solution with a detergent washing, restoring the glass to its original transparency, and yet the glass will remain resistant to the weathering effects that produce iridescence, scumming and staining. A greater degree of protection will be obtained if the residue of the dried solution is allowed to remain on the surface of the glass during storage.

By applying the solution at this elevated temperature, the resulting protection imparted to the glass is superior to that obtained by spraying the solution on the glass at room temperature. The elevated glass temperature during application of the solution also promotes rapid drying of the coating so that the glass can be handled, such as for cutting, immediately after the glass is cooled. The prepared zinc ammino chloride treating solution can also be heated to temperatures close to 100° C. and applied to cool glass surfaces, but the spraying operation tends to cool the solution rapidly before it comes in contact with the surface of the glass causing a loss of much of the benefit of heating the solution. By making the glass the heated component in the process, the sprayed solution is warmed as it contacts the glass surface, reacts with the glass in the desirable temperature range, and promotes desirable drying characteristics.

The basic zinc ammino chloride solution can be sprayed on at room temperature and good protection will result but only so long as the solution residue is not washed off the surface of the glass. Some improvement in the resistivity of the glass to iridescence, scumming and staining will develop even though applied at room temperature and washed off but not nearly to the same extent as when applied between 55° C. and 150° C. Application at room temperature does not promote bonding of the zinc ion to the glass surface except for a time contact effect and the subsequent detergent washing after a room temperature application removes most of the zinc as well as the chloride from the surface of the glass. The time contact effect refers to the phenomenon that the longer the zinc ammino chloride is contacted with the surface of the glass at room temperature the greater is the number of zinc ions that become bonded to the glass surface. The extent of zinc ion bonding to the surface of the glass is a linear function of contact time of the zinc ammino chloride residue with the glass surface.

The solution can also be sprayed on the glass up to glass surface temperatures around 650° C. and good protection will result even after the residue of the sprayed solution is washed off, but the glass being sprayed at such elevated temperatures may have a tendency to crack. Increased protection results whenever the residue of the treating solution is allowed to remain on the surface of the glass during storage whether applied at room temperature or elevated temperatures.

EXAMPLE II

Another preferred embodiment is to add an inert material to the same zinc ammino chloride basic solution, described in Example I, such as talcum, wood flour, hydrated calcium sulfate, kaolin or sawdust. A suitable mixture is to add 1.0 percent (by weight) wood flour to the 2 percent (by weight) alcoholic-aqueous zinc ammino chloride solution and spray the mixture on the surface of the glass in amounts equal to about 1/8 of a fluid ounce per square foot. The suspension is agitated to insure uniform distribution of the wood flour in the zinc ammino chloride solution during the spraying operation.

This mixture is sprayed on the glass at room temperature and allowed to remain on the glass during storage.

The wood flour acts as a parting compound to prevent seizing of the adjacent sheets of glass as they are normally stored in stacks, as a vehicle for more uniform coverage of the glass surface, as a means of applying greater concentrations of the treating solution to the surface of the glass, and as a coating that mechanically prevents moisture from reaching the surface of the glass.

The mixture of the treating solution and the wood flour can also be applied to the glass at temperatures between 55° C. and 150° C. This improves the resulting protection imparted to the glass surface and shortens the drying time of the treating coating.

EXAMPLE III

In another embodiment of the present invention the glass is treated with a 2.0 percent by weight solution of zinc ammino nitrate $(Zn(NH_3)_4(NO_3)_2)$. The treating solution is prepared by dissolving 20 grams of zinc nitrate in 600 milliliters of distilled water. A white precipitate of $Zn(OH)_2$ is thus formed. Concentrated ammonium hydroxide is then added to the solution until all of the zinc hydroxide precipitate redissolves. The pH of the solution at this time is about 10.0 to 10.5. Concentrated nitric acid is then added to the solution until the pH is adjusted to about 8.4. Additional distilled water is then added to increase the volume of the treating solution to 1 liter.

The treating solution is then applied to the glass by spraying or roll coating at room temperature. The treating solution can also be mixed with wood flour and then applied to the glass.

EXAMPLE IV

In another embodiment of the invention 20 grams of anhydrous $CuCl_2$ are dissolved in 1000 grams of a 50:50 (by weight) mixture of ethyl alcohol and distilled water. The pH obtained is in the acid range and is a pH of 3.4. When the anhydrous copper chloride is completely dissolved, the pH of the solution is adjusted to a pH of 8.4 with ammonium hydroxide as described in Example I for the adjustment of the zinc ammino chloride solution. The ammonium hydroxide addition develops a stable copper ammino chloride solution which is the active protection yielding agent. This solution is then applied in the same manner that the zinc ammino chloride solution was applied to the surface of the glass in Example I.

EXAMPLE V

A treating solution is prepared by dissolving 20 grams of polyvinyl alcohol and 8 grams of $ZnCl_2$ in 400 grams of a 50:50 (by weight) alcohol-water mixture. The pH of the solution is then adjusted with ammonium hydroxide as described in Example I to a pH value of about 8.4. The basically adjusted treating solution of zinc ammino chloride is then sprayed on both sides of sheets of white interleaving paper and allowed to dry. The sprayed and dried paper sheets are then placed between successive sheets of glass as it is normally stacked for storage.

The paper acts as a parting material that prevents the seizing of adjacent glass sheets in the stored stacks, as a means of keeping the protective agent in contact with the surface of the glass, as a means of insuring more uniform distribution of the protecting metallic salt over the surface of the glass, as a means of contacting greater concentrations of the metallic salt with the surface of the glass, and as a means of preventing moisture from reaching and collecting between the surfaces of the glass sheets. The polyvinyl alcohol reduces the tendency of the paper to wrinkle and thus insures a more uniform contact of the glass surface with the protecting agent during storage.

Glass specimens prepared in accordance with the invention as described herein were evaluated with respect to their resistance to weathering effects in an accelerated cyclic humidity weathering apparatus. Comparisons were made between untreated glass samples and samples of like base glass compositions treated in accordance with the present invention.

Accelerated cyclic humidity weathering apparatus

The apparatus used to conduct the accelerated weathering tests is a Precision Thelco Model 6 oven. The inside dimensions of the oven chamber are approximately 28 x 36 x 20 inches. The timing of the heating and cooling cycles for the oven during accelerated weathering testing consists of repeated 90-minute heating periods thermostatically controlled at 70° C. followed by 90-minute cooling periods during which the oven cools to about 49° C. The oven is provided with a controlled cyclic humidity chamber or cell constructed of ¼ inch glass sheets bonded together in a stainless steel frame with an epoxy adhesive to produce a rectangular glass box that is 15 x 34 x 17 inches in size. During the heating period of the cycle, water is evaporated in the humidity cell to produce a high humidity atmosphere at 70° C. about the glass specimens being tested. During the cooling period, the water in the cell's atmosphere condenses on the glass specimens to form a light fog on the surface of the glass. The repeated heating and cooling cycles subject the glass being tested to repeated drying and wetting cycles which accelerate weathering attack of the glass surface. It has been determined that one day's exposure in the cyclic humidity testing apparatus corresponds to approximately six months' summer exposure or eight months' winter exposure to actual unheated glass storage conditions in commercial use today. The oven contains four 25-watt electric light bulbs in the top of its structure to insure and maintain more uniform temperatures in the interior of the oven. The cyclic humidity cell or chamber is provided with a small fan which circulates the atmosphere contained in the cyclic humidity cell.

The glass sheets which are used as specimens in the testing procedure consist of 12 x 12 x ⅛ inch glass sheets which are sprayed with the various protective solutions to provide a coverage of approximately 1/16 of a fluid ounce per square foot and allowed to dry. The glass sheets thus prepared are then placed on small stainless steel racks and placed in the cyclic humidity chamber.

Table I compares the protection imparted to the same type of soda-lime-silica glass surface treated with acidic and basic solutions of amphoteric metals at room and elevated temperatures when tested in the accelerated cyclic humidity weathering apparatus. All solutions contain 2 percent by weight of the amphoteric metallic salt listed. The treating solutions whose pH values are in the acidic range were prepared by dissolving the amphoteric metallic salt listed in distilled water. The treating solutions whose pH values are in the basic range were adjusted to the basic pH value by adding ammonium hydroxide to the distilled water solution prepared from the amphoteric metallic salt listed. The results are given in terms of the weathering effects noted after a certain number of days in the accelerated weathering testing apparatus.

TABLE I

| Glass Treatment | Degree of Staining Under Cyclic-Humidy Exposure | | | | Condition of Surface After Exposure and Detergent Washing |
| --- | --- | --- | --- | --- | --- |
| | 1 day | 3 days | 6 days | 15 days | |
| None | Light | Heavy | Heavy | Heavy | Rough and scaled off areas. |
| $ZnCl_2$ (pH 5.4) applied at room temperature, washed before exposure. | Slight | Light | do | do | Rough and etched. |
| $ZnCl_2$ (pH 5.4) applied at room temperature, exposed with coating. | Very slight reaction marks. | Very slight reaction marks. | Very slight reaction marks. | Very slight reaction marks. | Very slight acidic reaction marks on glass surface. |
| $ZnCl_2$ (pH 5.4) applied at 150° C., washed before exposure | do | do | do | do | Very slight iridescence, with acidic reaction marks. |

TABLE I.—Continued

| Glass Treatment | Degree of Staining Under Cyclic-Humidy Exposure | | | | Condition of Surface After Exposure and Detergent Washing |
|---|---|---|---|---|---|
| | 1 day | 3 days | 6 days | 15 days | |
| ZnCl₂ (pH 5.4) applied at 150° C., exposed with coating | do | do | do | do | Do. |
| ZnCl₂ (pH 8.4) applied at room temperature, washed before exposure. | Slight | Light | Moderate | Heavy | Rough, etched surface. |
| ZnCl₂ (pH 8.4) applied at room temperature, exposed with coating. | None | None | None | None | Same as initial surface. |
| ZnCl₂ (pH 8.4) applied at 150° C., washed before exposure | do | do | do | do | Same as initial glass. |
| ZnCl₂ (pH 8.4) applied at 150° C., exposed with coating | do | do | do | do | Do. |
| CuCl₂ (pH 3.4) applied at room temperature, washed before exposure. | Light | Moderate | Heavy | Heavy | Rough opaque areas. |
| CuCl₂ (pH 3.4) applied at room temperature, exposed with coating. | None | None | Very slight | Very slight | Very slight etching in scattered areas. |
| CuCl₂ (pH 3.4) applied at 150° C., washed before exposure | do | Slight | Light to moderate. | Light to moderate. | Slightly etched. |
| CuCl₂ (pH 8.6) applied at room temperature, washed before exposure. | Slight | Light | Moderate | Moderate | Hazy with some etching. |
| CuCl₂ (pH 8.6) applied at room temperature, exposed with coating. | None | None | None | None | Same as initial glass. |
| CuCl₂ (pH 8.6) applied at 150° C., washed before exposure | do | Slight | Moderate | Moderate | Slight discolorations scattered at random. |

Table II describes the results obtained from an experiment performed to determine the concentrations of amphoteric metallic salt solutions necessary to protect glass from weathering effects. The treating solutions were adjusted to the basic pH value noted with ammonium hydroxide. The solutions were sprayed on the glass samples at room temperature in amounts approximately equal to 1/16 of a fluid ounce per square foot of glass and allowed to dry. The coated glass samples were tested in the accelerated weathering apparatus for 30 days with the coatings left on the glass and the degree of weathering attack noted. One day's accelerated weathering exposure again corresponded to between 6 and 8 months' exposure in unheated warehouse storage. Untreated glass exposed to 30 days' attack in the accelerated weathering apparatus exhibits severe staining and weathering deterioration.

| Component | Compositions | | | |
|---|---|---|---|---|
| | A | B | C | D |
| SiO₂ | 73.0 | 71.6 | 71.25 | 71.2 |
| Na₂O | 13.2 | 13.1 | 13.37 | 13.7 |
| K₂O | | | | |
| CaO | 8.5 | 11.7 | 11.71 | 11.8 |
| MgO | 3.5 | 2.5 | 2.41 | 2.3 |
| Al₂O₃ | 1.2 | 0.2 | 0.15 | 0.2 |
| Na₂SO₄ | 0.4 | 0.7 | 0.60 | |
| NaCl | 0.1 | 0.1 | | |
| Fe₂O₃ | 0.1 | 0.1 | 0.51 | 0.4 |
| SO₃ | | | | 0.4 |
| NiO | | | | 0.0009 |
| CoO | | | | 0.008 |
| Se | | | | 0.005 |

TABLE II.—EFFECT OF CONCENTRATION OF METALLIC CHLORIDE ON STAINING OF GLASS

| Surface Treatment | pH | Percent Composition of the Solution for Surface Treatment | | | |
|---|---|---|---|---|---|
| | | 0.1% | 0.5% | 1.0% | 2.0% |
| CuCl₂ | 8.2–8.4 | Heavy stain | Heavy stain | Moderate stain | No stain. |
| CrCl₃ | 8.2–8.4 | Moderate | Moderate to light | Scattered, light stain. | Do. |
| ZnCl₂ | 8.2–8.4 | Light stain | Light stain | Very light stain in spots. | Do. |

Table III shows weathering data for various glass compositions treated with zinc ammino nitrate. The treated samples were stored in warehouses and examined at six-month intervals.

TABLE III

| Composition | | Surface Condition | | | |
|---|---|---|---|---|---|
| | | 6 months | 12 months | 18 months | 24 months |
| A | None | Light staining | Moderate to heavy staining. | Moderate to heavy staining. | Moderate to heavy staining. |
| A | Zn(NH₃)₄(NO₃)₂(pH 8.4) sprayed at room temperature exposed with coating. | No staining | No staining | No staining | No staining. |
| B | None | do | Moderate to heavy staining. | Heavy staining | Heavy staining. |
| B | Zn(NH₃)₄(NO₃)₂(pH 8.4) sprayed at room temperature exposed with coating. | do | No staining | No staining | No staining. |
| B | Zn(NH₃)₄(NO₃)₂(pH 8.4) roll-coated at room temperature exposed with coating. | do | do | do | Do. |
| C | None | do | Very light staining. | Heavy staining | Heavy staining. |
| C | Zn(NH₃)₄(NO₃)₂(pH 8.4) sprayed at room temperature exposed with coating. | do | No staining | No staining | No staining. |
| C | Zn(NH₃)₄(NO₃)₂(pH 8.4) roll-coated at room temperature exposed with coating. | do | do | do | Do. |
| D | None | do | Very light staining. | Moderate staining. | Heavy scumming and moderate staining. |
| D | Zn(NH₃)₄(NO₃)₂(pH 8.4) sprayed at room temperature exposed with coating. | do | No staining | No staining | No staining. |
| D | Zn(NH₃)₄(NO₃)₂(pH 8.4) roll-coated at room temperature exposed with coating. | do | do | do | Do. |

The calculated compositions of the glasses listed and treated as indicated in Table III are presented below. All percentages are in percent by weight.

Table IV shows the weathering durability results for glass composition A, untreated and treated with a 2.0 percent solution of Zn(NH₃)₄(NO₃)₂. The test was conducted in the cyclic humidity apparatus.

TABLE IV

Treatment:
- None—Heavy staining after 1 day.
- $Zn(NH_3)_4(NO_3)_2$ (pH 8.4) Sprayed on at room temperature, exposed with coating—No staining after 7 days.
- $Zn(NH_3)_4(NO_3)_2$ (pH 8.4) Sprayed on at room temperature, washed before exposure—Light to moderate staining after 7 days.

The present invention will protect ordinary glass compositions that are subject to weathering from iridescence, scumming and staining. The invention will protect glass compositions contained in the range of the following oxide percentages.

| Oxide: | Percent |
|---|---|
| $SiO_2$ | 60–75 |
| $Na_2O$ | 10–20 |
| $K_2O$ | 0–10 |
| $Na_2O + K_2O$ | 10–21 |
| $CaO$ | 5–16 |
| $MgO$ | 0–10 |
| $CaO + MgO$ | 5–18 |
| $Al_2O_3$ | 0–2 |

These oxide ranges encompass the ordinary commercial window and plate glass compositions.

The prior art reveals that the incorporation of metallic ions into the surface of glass decreases the tendency of the glass to weather. It was unexpected, however, that basic solutions of amphoteric metallic ammino compounds would eliminate the slight etching stain that developed on the surface of the glass whenever acidic agents were used in applying the metallic ions. It was also unexpected that the residue from the solution used to treat the glass would be easier to remove if the treating solutions were adjusted to a basic pH range and that having the metallic ion deposited from a metallic ammino compound in solution would result in a greater degree of glass surface protection.

The invention is not limited to the embodiments which have been described by way of example, and it would not be a departure from its scope to incorporate modifications, either as regards the composition of the basic treating solution, or of that of the inert carrier materials or even from the method of their application.

Any method in which an amphoteric metal ion or mixture of amphoteric metallic ions is incorporated into the surface of glass by means of a basically adjusted solution of a metallic ammino compound will not be a departure from this invention.

We claim:

1. An article of manufacture which comprises a soda-lime-silica glass sheet having a coating of a dried residue of a basic solution consisting essentially of at least 0.5 percent by weight of a metal ammino halide or a metal ammino nitrate and sufficient ammonium hydroxide to control the pH of said solution to between 7 and 11 on its surface to render said surface substantially resistant to staining, iridescence, and scumming, the metal being an amphoteric metal selected from the group consisting of zinc, copper, chromium, lead, aluminum and beryllium.

2. The article of claim 1 wherein the metal ammino halide is zinc ammino chloride.

3. The article of claim 1 wherein the metal ammino nitrate is zinc ammino nitrate.

4. A process for the protection of a soda-lime-silica glass sheet from iridescence, scumming and staining which comprises contacting at a temperature below above 200° C. the surface of the glass with a basic solution consisting essentially of at least about 0.5 percent by weight of an amphoteric metallic ammino compound selected from the class consisting of metal ammino halides and metal ammino nitrates and sufficient ammonium hydroxide to control the pH of said solution to between 7 and 11 and drying the solution to deposit a residue of the amphoteric metal ammino compound on the glass sheet, the metal of the compound being selected from the group consisting of zinc, copper, chromium, lead, aluminum and beryllium.

5. The method of claim 4 wherein the basic solution is aqueous.

6. The method of claim 4 wherein the metallic ammino halide is zinc ammino chloride.

7. The method of claim 4 wherein the metallic ammino nitrate is zinc ammino nitrate.

8. A process for the protection of a soda-lime-silica glass sheet from iridescence, scumming and staining which comprises:
   (1) preparing a basic solution consisting essentially of at least about 0.5 percent by weight of an amphoteric metal ammino halide or metal ammino nitrate, and sufficient ammonium hydroxide to control the pH of said solution to between 7 and 11, the metal being selected from the group consisting of zinc, copper, chromium, lead, aluminum, and beryllium;
   (2) coating an inert carrier taken from the class of inert materials consisting of talcum, wood flour, hydrated calcium sulfate, kaolin, micaceous materials, sawdust, paper, and combinations of said inert materials with the solution; and
   (3) contacting the glass sheet at a temperature below about 200° C. with the coated carrier.

9. The method of claim 8 wherein the inert carrier is paper.

10. The method of claim 8 wherein the inert carrier is a powdery material taken from the class of inert materials consisting of talcum, wood flour, hydrated calcium sulfate, kaolin, micaceous materials, sawdust, paper and combinations of said inert materials.

References Cited

UNITED STATES PATENTS

| 1,095,663 | 5/1914 | Murtha | 106—13 |
| 2,712,363 | 5/1951 | Vaughn et al. | 252—387 X |
| 3,258,521 | 6/1966 | Francel et al. | |

FOREIGN PATENTS

| 579,656 | 7/1959 | Canada. |

ALFRED L. LEAVITT, Primary Examiner

W. F. CYRON, Assistant Examiner

U.S. Cl. X.R.

117—169